(No Model.) 4 Sheets—Sheet 1.
W. P. QUENTELL.
CAN SOLDERING MACHINE.
No. 479,174. Patented July 19, 1892.
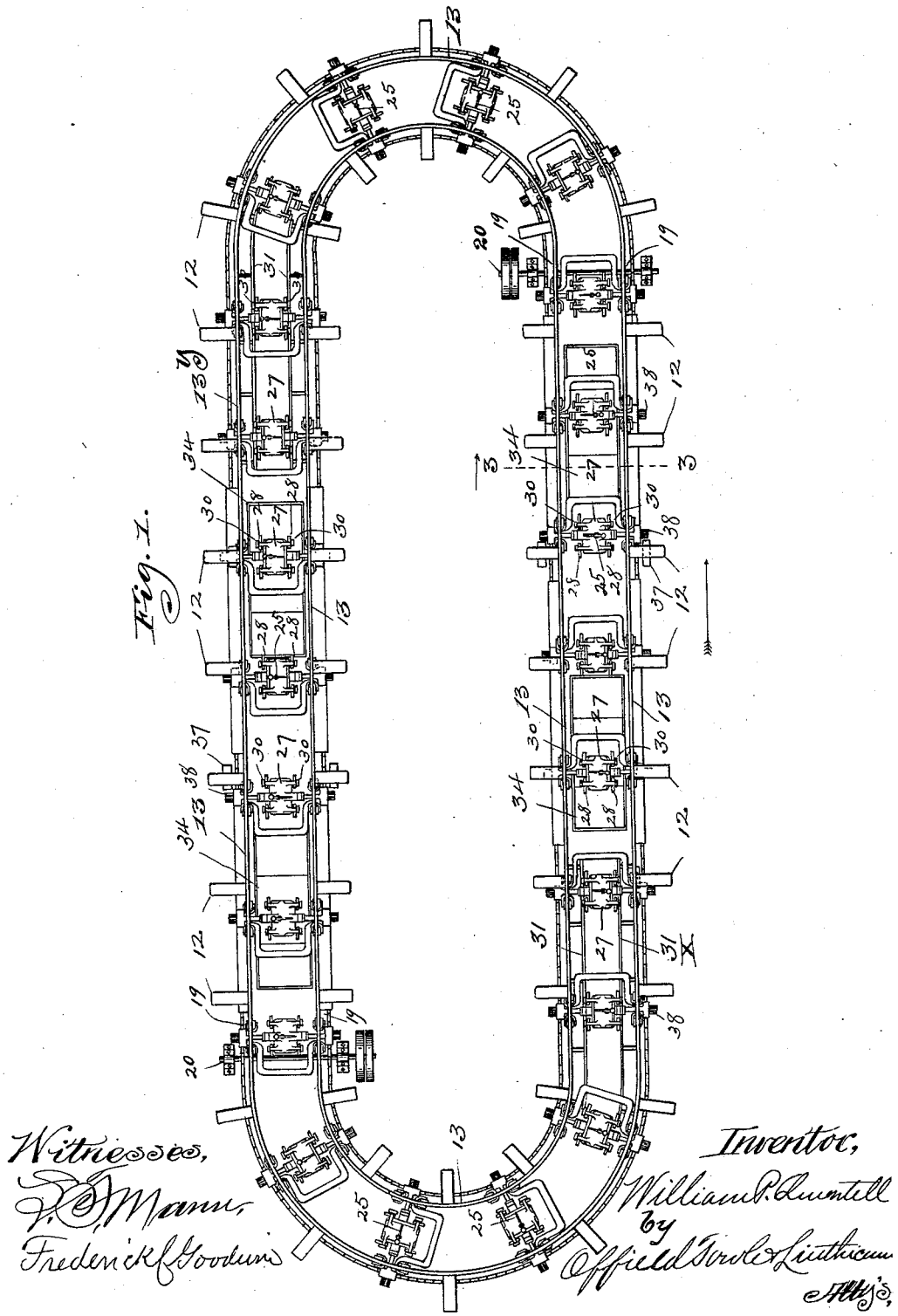
Witnesses,
Inventor,
William P. Quentell
by
Offield Towle & Linthicum
Atty's (No Model.) 4 Sheets—Sheet 2.
W. P. QUENTELL.
CAN SOLDERING MACHINE.
No. 479,174. Patented July 19, 1892.
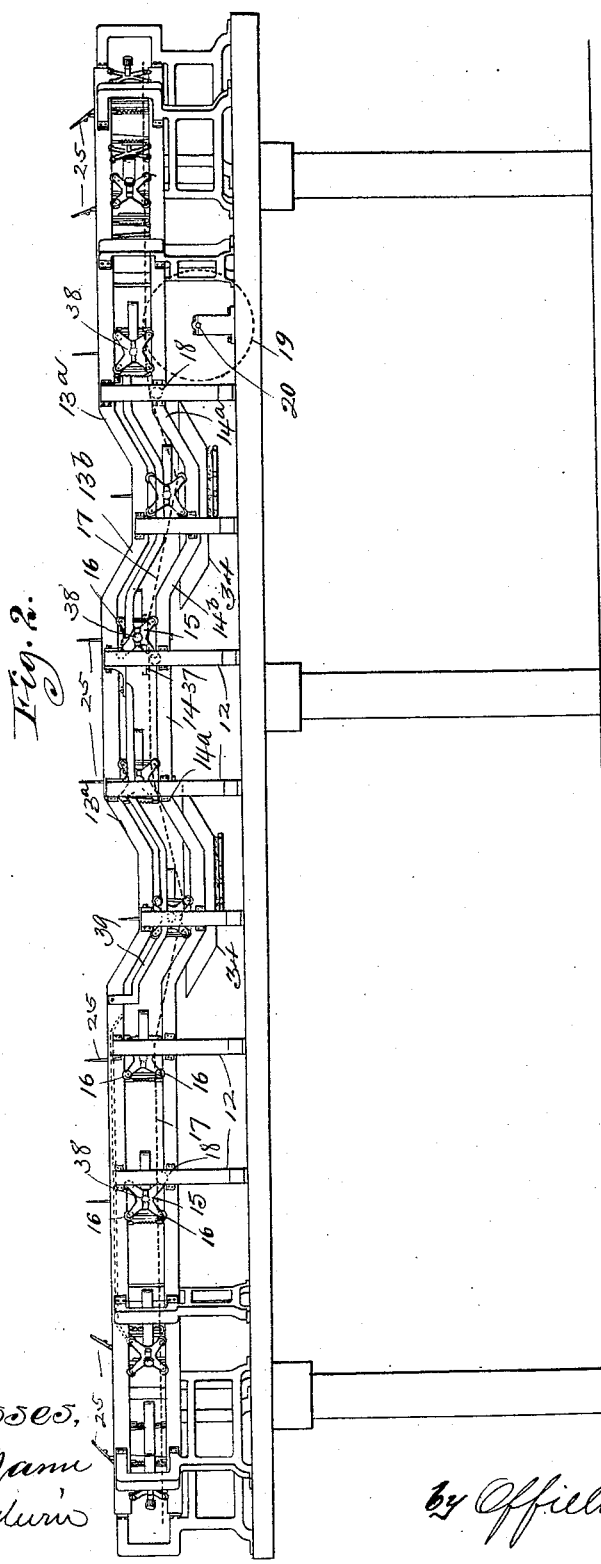
Witnesses,
Inventor,
William P. Quentell
by Offield Towle & Linthicum
Attys.
THE NORRIS PETERS CO., PHOTO-LITHO., WASHINGTON, D. C.

(No Model.) 4 Sheets—Sheet 3.
W. P. QUENTELL.
CAN SOLDERING MACHINE.
No. 479,174. Patented July 19, 1892.
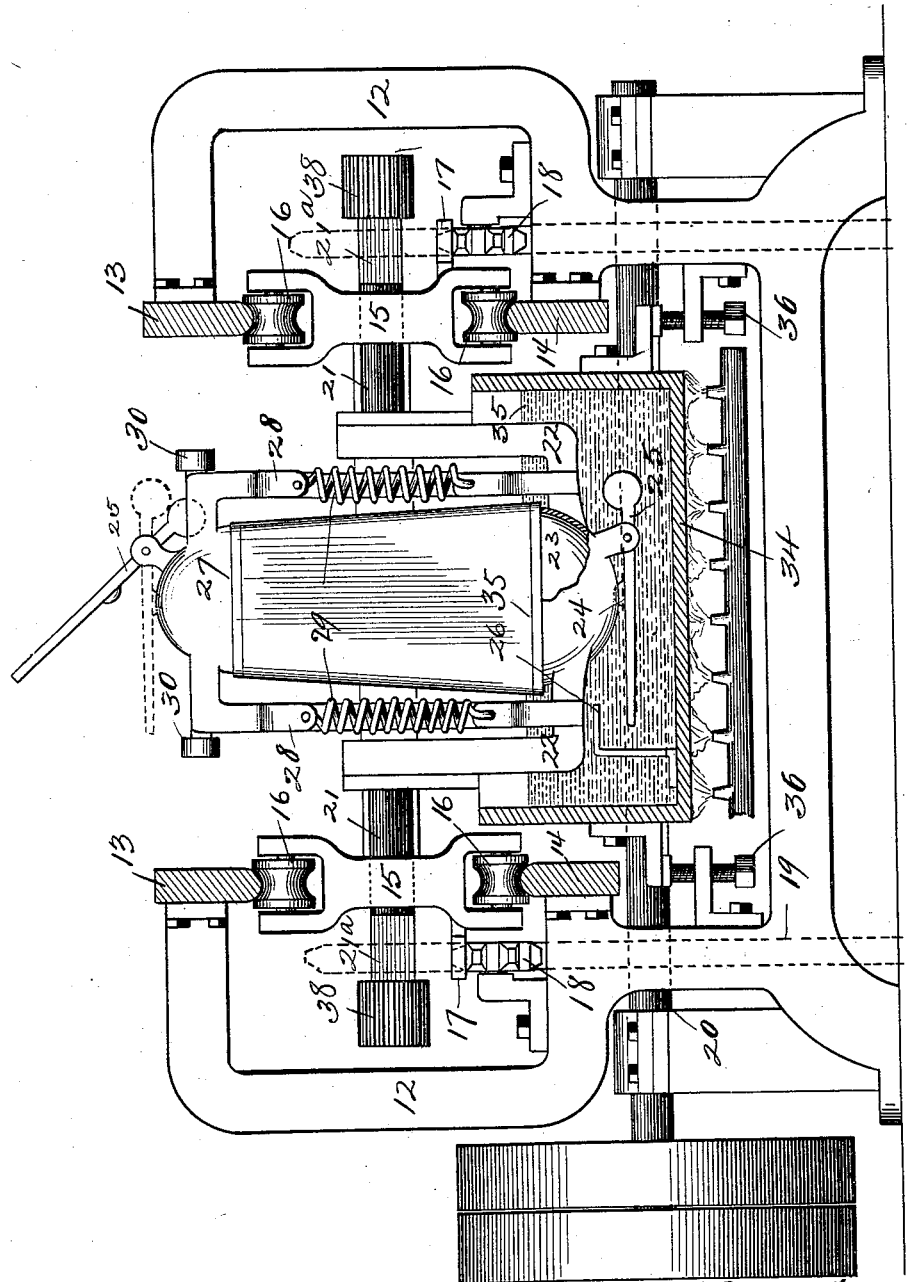
Witnesses,
J. F. Mann
Frederick F. Goodwin
Inventor,
William P. Quentell
By Offield Towle Linthicum
Attys.

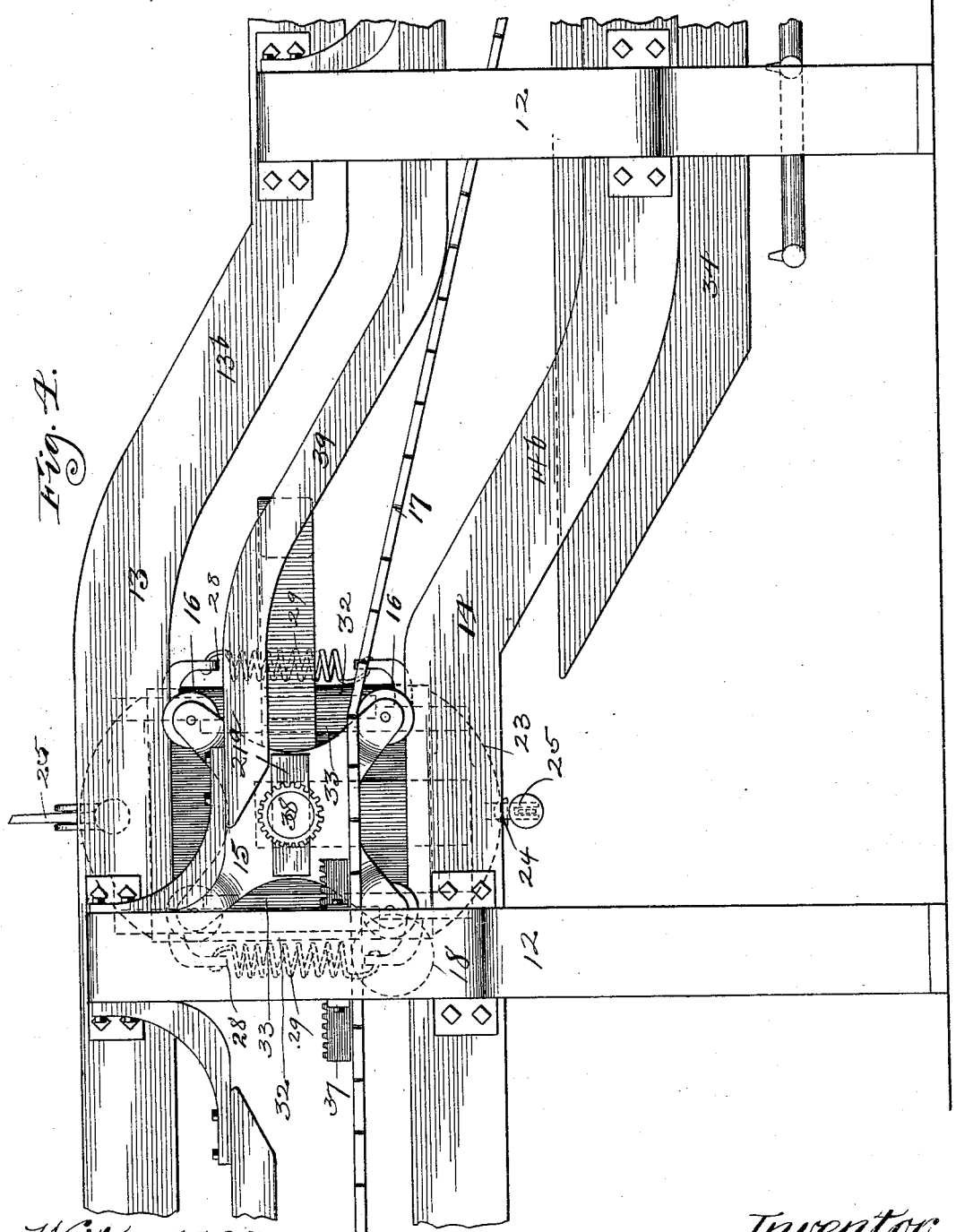

UNITED STATES PATENT OFFICE.

WILLIAM P. QUENTELL, OF KANSAS CITY, MISSOURI.

CAN-SOLDERING MACHINE.

SPECIFICATION forming part of Letters Patent No. 479,174, dated July 19, 1892.

Application filed October 31, 1891. Serial No. 410,529. (No model.)

*To all whom it may concern:*

Be it known that I, WILLIAM P. QUENTELL, a citizen of the United States, residing at Kansas City, in the county of Jackson and State of Missouri, have invented certain new and useful Improvements in Can-Soldering Machines, of which the following is a specification.

My invention relates to machines for soldering the heads upon the bodies of sheet-metal cans; and it is the object of my invention to provide a machine which shall be adapted, when the can is placed in position, to automatically pass the can through a solder bath, so as to solder the head by floating, and then to reverse the can in position, so as to solder the other head.

My invention also consists in certain novel features of construction, which will be hereinafter described, and particularly pointed out in the claims.

In the preferred construction my can-soldering apparatus comprises an endless track comprising two track-rails spaced a suitable distance apart, carriers moving upon said track-rails, can-supports pivotally mounted upon said carriers, said can-supports comprising hollow cups which are adapted to seat themselves within the depressed or sunken portions of the heads of the cans, said cups being movable to and from each other in order to grasp or release the can and yieldingly held in contact with the heads thereof, and means for rotating the can-supports, so as to reverse the position of the can, whereby its ends may be successively dipped or passed through the molten solder for the purpose of soldering the heads. I also provide means for automatically separating the cups, so as to release the cans at the proper time, and means for discharging any solder which may pass to the interior of the cups, out therefrom, and into the solder-well.

In the accompanying drawings, Figure 1 is a plan view of the apparatus. Fig. 2 is a side elevation thereof. Fig. 3 is a cross-section on the line 3 3 of Fig. 1. Fig. 4 is a side elevation of one of the carriages and a part of the track and solder-well.

In the construction shown I employ a suitable supporting framework 12, upon which are secured at suitable distances apart upper track-rails 13 and lower track-rails 14.

15 represents the frame of a carriage having travelers 16 at its corners, which travelers roll upon the upper and lower track-rails respectively. These travelers are arranged in pairs and they are driven by means of an endless chain 17, connected to them, and which chain is carried over idlers 18 and driven by gears 19 on a driving-shaft 20. The carriages have journaled therein the axles 21, which bear yokes 22, said yokes being fashioned between their stems into a hollow cup 23, which forms one of the can-supports. This cup is a hollow casting provided with a vent in its bottom and closed by a valve 24, carried on a weighted lever 25. The cup is intended to be of the same shape as the head of the can and of sufficiently less diameter to enable it to be seated upon the depressed portion of the head or within its flange, and the purpose of the cup is to prevent the molten solder from finding its way along the head of the can and thus deface or mar it. Should any solder escape to the interior of the cup, it will be discharged through the vent in its bottom by the engagement of the weighted lever with the trip 26, stationed at the proper place, so that the solder will be discharged back into the well.
The upper support 27 is also a cup-shaped casting having arms or yokes 28, which are yieldingly connected by means of the springs 29 with the yokes 22. The yokes 28 carry travelers 30, which are adapted at certain intervals to engage with track-sections 31 for the purpose of separating the cups to permit the release of a finished can and permit the insertion of a new can.

32 33 represent guides affixed, respectively, to the upper and lower supports or to the yokes bearing such supports, said guides serving to prevent the lateral movement of the cups with reference to each other. At suitable intervals along the track are stationed solder-wells 34, in which solder will be maintained in a liquid condition, the solder-line being indicated at 35. In order to adjust the solder-well to adapt it for use with cans of different lengths, I mount it upon the adjusting-screws 36.

The apparatus illustrated in the drawings is intended to be managed by two attendants, whose stations are indicated at X Y, respectively. At each of these stations a track-section—such as 31—is placed, and when this track-section is reached the supports or cups are separated by the riding of the travelers 30 upon such track. This permits the finished can to be removed and a new can to be put in place, and this change of cans is effected without stopping the travel of the apparatus. As the travelers 30 pass off the track-sections 31, the carriages pass down a decline in the main track and one end of the can dips into the solder-well. Beyond the solder-well the track-rails 13 14 have an incline $13^a 14^a$, which lifts the carriage as the wheels pass up said incline. Beyond the apex of this incline is arranged a rack 37, which engages pinions 38, carried upon the axles 21. As the travelers 16 pass down the declines $13^b 14^b$, the racks 37 engage the pinions 38, and thus rock the axles in their bearings and reverse the position of the can. The unsoldered end of the can then passes into the solder-well, and after being soldered it is raised out of the solder-well by the configuration of the track-rails, and arriving at the track-sections 31 at the next station the clamps will be separated and the can may be removed.

In the drawings I have shown cans of pyramidal form, and in soldering cans of this shape the cup for the large end of the can will be of greater weight than the cup for the small end, and therefore the supports and can if not restrained would by the action of gravity turn into such position as to always present the large end of the can to the solder. To restrain this tendency, the axles 21 have a squared portion $21^a$, and at the second solder-well from each station there are provided guide-rails 39, between which the squared portions of the axles pass, and this prevents the reversal of the carriage until after the second solder-well is passed and the small end of the can soldered.

I do not, of course, limit my invention to an apparatus designed for soldering so-called "square" cans only, nor to an apparatus wherein all of the several features hereinabove described are employed.

The usual provisions will be made for wiping the surfaces to be soldered with an acid prior to immersing them in the solder.

In my apparatus the cans are rigidly clamped from the time they are placed until they are ready to be discharged, and the reversing action is accomplished without bringing anything to bear upon the can-bodies directly and without bringing them in contact with cam-tracks or other reversing mechanism, the use of which would tend to dent or deface the can.

Without limiting myself to the precise details of construction and arrangement of parts, I claim—

1. In a can-soldering apparatus, the combination of a track having inclined portions therein, solder-wells located along said track, carriers moving thereon, reversible can-supports mounted in said carriers, means for moving said carriers over the track and causing the can to dip into the molten solder without rotating the can, and means for reversing the supports, whereby to present the ends of the can successively to the solder, substantially as described.

2. In a can-soldering apparatus, the combination of a track having inclines therein, solder-wells located along said track, carriers moving on the track, can-supports journaled in the carrier, said can-supports being yieldingly connected, a supplemental track adapted to engage one of the supports, whereby to separate them at proper intervals, means for moving the carriers along the track and inclines, whereby the ends of the can are dipped into and then raised out of the solder without rotation of the cans, and means for reversing the can-supports, whereby the ends of the can are presented successively to the solder, substantially as described.

3. In a can-soldering apparatus, a can-support comprising a hollow cup having a vent in its bottom and a valve carried by a pivoted lever, said valve adapted to seal said vent, and a trip to rock the lever whereby to open the valve, substantially as described.

4. In a can-soldering apparatus, the combination of a track having inclines therein, carriers adapted to move upon said track, can-supports journaled in said carriers, a gear upon the journal of the can-support, a rack located between the solder-wells and adapted to engage said gear, whereby to rock the journal and reverse the position of the can, and means for propelling the carriers over said track and inclines, whereby the ends of the can are successively dipped into and then out of the solder without rotation of the cans, substantially as described.

5. In a can-soldering apparatus, can-supports consisting of hollow cups yieldingly connected together, said cups being adapted to bear upon the heads of the can inside the flange thereof and their hollow bodies serving to receive superfluous solder, substantially as described.

WILLIAM P. QUENTELL.

Witnesses:
C. C. LINTHICUM,
FREDERICK C. GOODWIN.